Feb. 8, 1944.     P. HELLMAN     2,341,099
DIVIDING HEAD
Filed July 20, 1942

Inventor
Paul Hellman.
Attorney.

Patented Feb. 8, 1944

2,341,099

UNITED STATES PATENT OFFICE 2,341,099

DIVIDING HEAD

Paul Hellman, Los Angeles, Calif., assignor to Globe Products Manufacturing Company, Los Angeles, Calif., a corporation of California Application July 20, 1942, Serial No. 451,624

5 Claims. (Cl. 90—57)

My invention has to do with indexing heads and has for one of its more particular objects the provision of an indexing mechanism embodying an improved latch pin construction and arrangement.

Another object is the provision of an indexing head which is capable of being made relatively small, compact and economical and which is also capable of operating with great precision.

Another object is the provision, in such a device, of improved means for relieving the indexing parts from strain during heavy cutting operations.

Still further objects and advantages are present in my invention and how those as well as the objects hereinabove specifically mentioned are achieved will be made clear by the following detailed description of a presently preferred apparatus containing one embodiment of the invention, for which purpose I shall refer to the accompanying drawing, in which.

Figure 1:
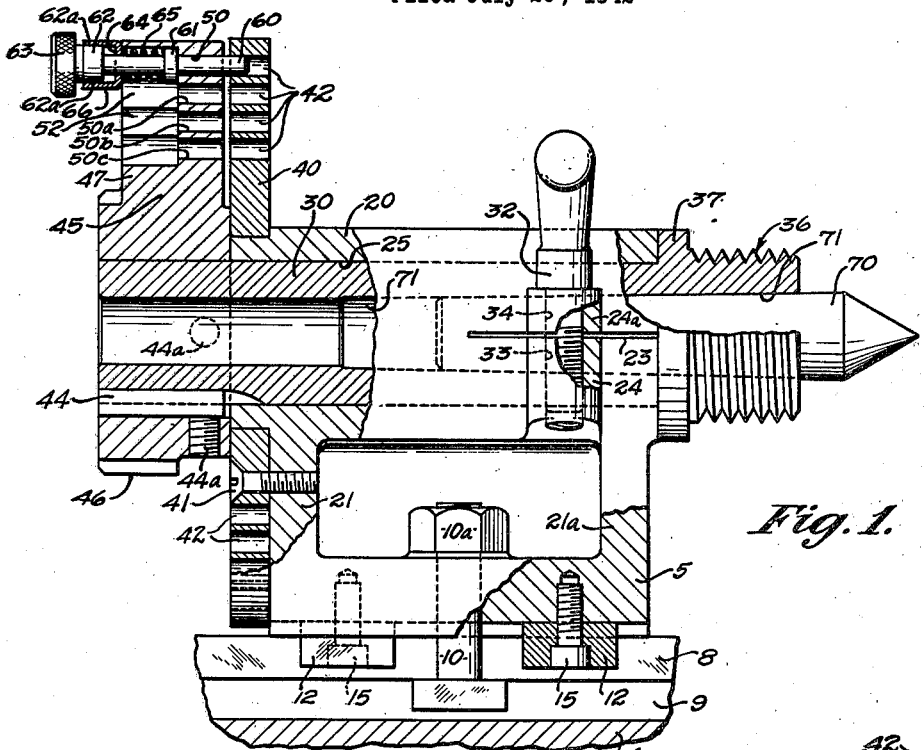
Fig. 1 is a side view, partly in elevation and partly in section, showing a headstock embodying my invention.

With particular reference now to the drawing, I illustrate only the headstock end of my indexing head since that is sufficient for explaining the invention. It will be understood, of course, that the headstock illustrated is normally used with a tailstock member when holding work which must be supported between centers, and any of the well known tailstocks of conventional structure may be employed in conjunction with the headstock which I illustrate.

I show at 5 a base secured, for example, to the work table 6 of a milling machine or of a lathe when equipped for milling purposes. I here show table 6 as having ways 8 provided by a T-slot 9. Base 5 is secured to the table 6 by bolt 10 and nut 10a, and guide bars 12 are secured to the base by cap screws 15. The guide bars are movable along ways 8 during adjustments of the base with respect to the work table.

A spindle housing 20 is supported from the base by uprights 21, 21a. Housing 20 is longitudinally slotted at 23, the slot extending entirely through the bosses 24, 24a and the side wall of the housing, intersecting the bore 25 of the housing, to permit the housing to be clamped about the hollow spindle 30 by the handled screw 32 which is mounted in the registering holes 33, 34 in the bosses, being threaded in hole 33. This clamping means makes it possible to relieve the indexing parts to be described of strain during relatively heavy cutting operation. The outer end of spindle 30 is externally threaded at 36 to receive a chuck, face plate or the like, not shown, and has an annular flange 37 rotatably bearing against the outer end of the housing.

An indexing plate 40 is non-rotatably secured to the inner end of the housing by means of a screw 41, this indexing plate being provided with indexing holes 42 arranged in concentric circles, the holes of each circle being equidistantly spaced.

Secured to the inner end of the spindle 30, as by a key 44 and set screws 44a, I provide a crank 45 which carries an integral hand wheel portion 46 and indexing arm 47.

Figure 3:
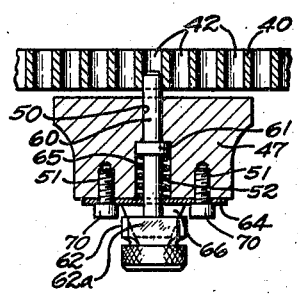
Fig. 3 is a section taken on line 3—3 of Fig. 2.
Figure 2:
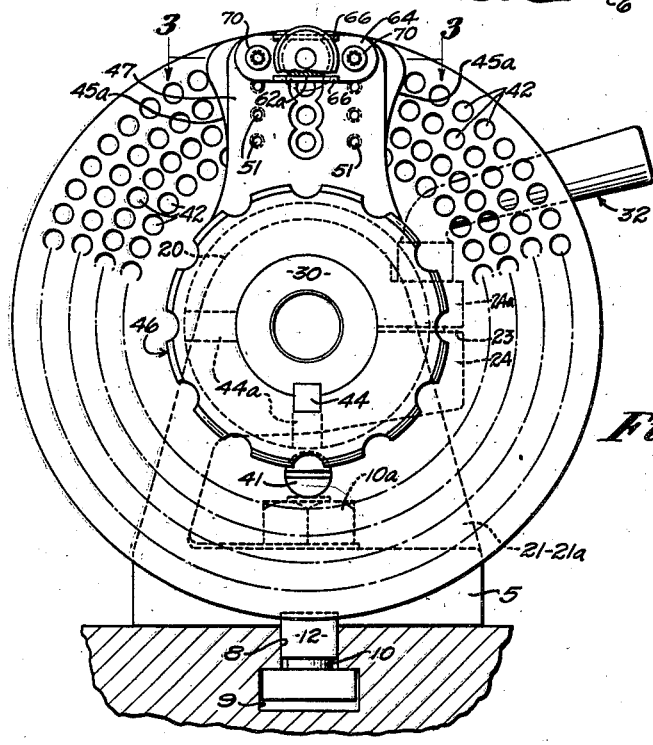
Fig. 2 is an end view.

Radially alined latch pin receiving holes 50, 50a, 50b, 50c are provided through indexing arm 47, which holes are so positioned as to be registerable with the respective holes 42 in the indexing plate upon rotation of the crank member 45. Indexing arm 47 is also provided with two rows of threaded holes 51 (see Figs. 2 and 3) for the purpose to be described.

A latch pin 60, having longitudinally spaced annular shoulders 61, 62 and a knurled operating knob 63, is normally urged inwardly of the hole in the indexing arm in which it is selectively mounted and into engagement with the registering hole 42 in the indexing plate, by means of a surrounding coil spring 65. Spring 65 seats at its outer end against shoulder 61 and seats at its inner end against a retaining plate 64, which plate presents guide portions 66 to slidably carry the shoulder portion 62 of the latch pin. Shoulder 62 is flattened at opposite sides, as shown at 62a, which flattened portions engage the guide portions 66 of the retaining plate when the pin is in position engaging a hole 42. Thus when the latch pin is pulled outwardly from a hole 42 and turned a quarter turn the pin is held out of engagement with holes 42. The outer end of each hole 50, 50a, 50b, 50c has a counterbore 52 to slidably carry shoulder 61 of the latch pin. I secure the retaining plate 64 to the indexing arm by a pair of cap screws 70 which may be selectively, threadedly engaged in two of the holes 51, here shown as the outermost holes.

A work engaging center 70 is shown mounted in the tapered bore 71 of the hollow spindle 30 and it will be understood that the work, not shown, is usually held in position between the outer end of the center 70 and a center carried by a tailstock member, not shown; a chuck or face plate, not shown, usually being screwed onto the threaded end 36 of the spindle.

In operation, the spindle 30 is rotated by the the crank commensurately with the number of indexing holes desired to be skipped in moving the latch pin 60 from one indexing hole to another. Any of the circular rows of indexing holes may be employed by the simple operation of moving the retaining plate and its carried latch pin into the appropriate position by removing and reinserting the screws 70.

The outermost row of holes 42 in the indexing plate is shown as numbering sixty holes, the next row fifty-six, the next row fifty-four and the innermost row forty-four holes. The side edges of the outer end portions of the crank are inwardly curved at 45a so that although the several rows of indexing holes 42 are concentric said portion of the crank so varies in width to cover the same number of holes 42 in each row to enable the operator to easily and uniformly determine the spacing regardless of which row of indexing holes may be used.

Within the broader aspects of my invention as defined by the appended claims, the structure hereinabove specifically described for the purposes of making my invention understood, may be varied in various respects, since the invention is capable of being carried out in other specific forms of apparatus.

I claim:

1. An indexing head comprising: a spindle housing, a spindle rotatably carried in the housing, an indexing plate secured on the housing, concentric circular rows of indexing holes in the indexing plate, a crank secured on the inner end of the spindle coaxial with the indexing plate, radially alined holes through the crank in position to be selectively registered with holes in the indexing plate upon rotation of the crank relative to the indexing plate, a retaining plate adjustably mounted on the crank, said plate having an opening selectively registerable with the respective holes in the crank, and a latch pin carried by the retaining plate, said pin being selectively engageable in registering holes in the crank and indexing plate upon rotation of the crank with respect to the indexing plate.

2. An indexing head comprising: a spindle housing, a spindle rotatably carried in the housing, an indexing plate secured on the housing, concentric circular rows of indexing holes in the indexing plate, a crank secured on the inner end of the spindle coaxial with the indexing plate, radially alined holes through the crank in position to be selectively registered with holes in the indexing plate upon rotation of the crank relative to the indexing plate, a retaining plate adjustably mounted on the crank, said plate having an opening selectively registerable with the respective holes in the crank, a latch pin slidably mounted in a selected hole in the crank for selectively engaging the indexing holes upon rotation of the crank relative to the indexing plate, and spring means bearing at one end against the latch pin and at its other end against the retaining plate, whereby normally to urge the latch pin into engagement with a selected indexing hole.

3. An indexing head comprising: a spindle housing, a spindle rotatably carried in the housing, an indexing plate secured on the housing, concentric circular rows of indexing holes in the indexing plate, a crank secured on the inner end of the spindle coaxial with the indexing plate, radially alined holes through the crank in position to be selectively registered with holes in the indexing plate upon rotation of the crank relative to the indexing plate, a retaining plate adjustably mounted on the crank, said plate having an opening selectively registrable with the respective holes in the crank, a latch pin slidably mounted in a selected hole in the crank for selectively engaging the indexing holes upon rotation of the crank relative to the indexing plate, spring means bearing at one end against the latch pin and at its other end against the retaining plate, whereby normally to urge the latch pin into engagement with a selected indexing hole, and a guide for the latch pin, said guide being carried by the retaining plate.

4. An indexing head comprising: a spindle housing, a spindle rotatably carried in the housing, an indexing plate secured on the housing, concentric circular rows of indexing holes in the indexing plate, a crank secured on the inner end of the spindle coaxial with the indexing plate, radially alined holes through the crank in position to be selectively registered with holes in the indexing plate upon rotation of the crank relative to the indexing plate, a retaining plate adjustably mounted on the crank, said plate having an opening selectively registerable with the respective holes in the crank, a latch pin slidably mounted in a selected hole in the crank for selectively engaging the indexing holes upon rotation of the crank relative to the indexing plate, spring means bearing at one end against the latch pin and at its other end against the retaining plate, whereby normally to urge the latch pin into engagement with a selected indexing hole, and a cup-shaped guide carried by the retaining plate and slidably housing the outer end portion of the latch pin.

5. An indexing head comprising: a spindle housing, a spindle rotatably carried in the housing, an indexing plate secured on the housing, concentric circular rows of indexing holes in the indexing plate, a crank secured on the inner end of the spindle coaxial with the indexing plate, radially alined holes through the crank in position to be selectively registered with holes in the indexing plate upon rotation of the crank relative to the indexing plate, a retaining plate adjustably mounted on the crank, said plate having an opening selectively registerable with the respective holes in the crank, means for securing the retaining plate in adjusted position on the crank, including parallel rows of threaded holes in the crank, holes through the retaining plate selectively registerable with said holes in the crank and screw means engageable in said registered holes, and a latch pin slidably carried by the retaining plate, said pin being selectively engageable in the indexing holes upon rotation of the crank relative to the indexing plate.

PAUL HELLMAN.